UNITED STATES PATENT OFFICE.

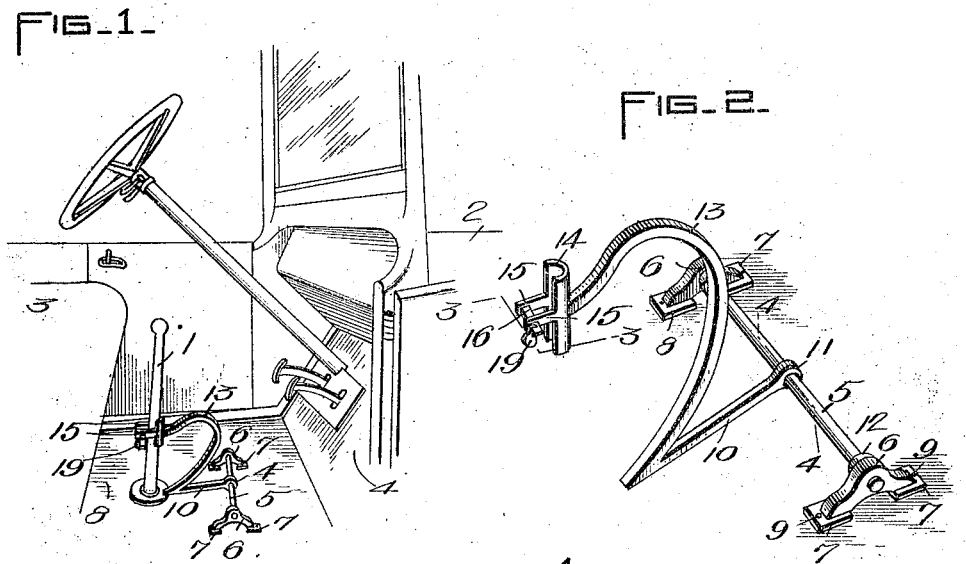
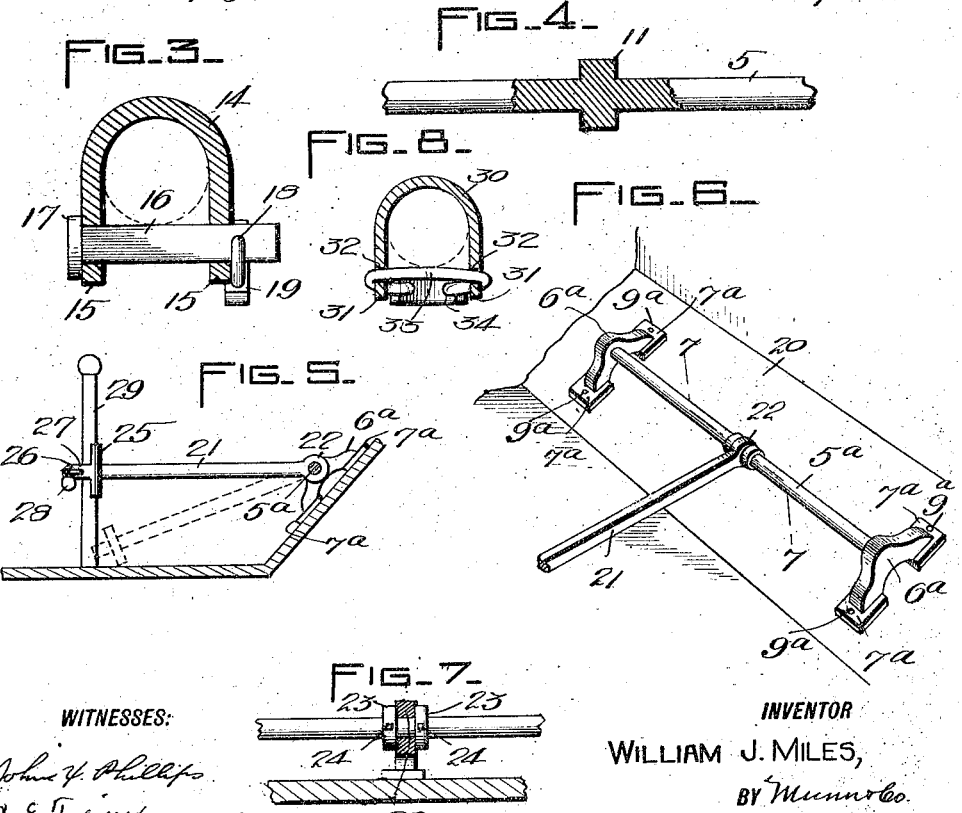

WILLIAM J. MILES, OF DENVER, COLORADO.

AUTOMOBILE-LOCK.

1,170,310. Specification of Letters Patent. Patented Feb. 1, 1916.

Application filed June 16, 1915. Serial No. 34,406.

*To all whom it may concern:*

Be it known that I, WILLIAM J. MILES, a citizen of the United States, and a resident of Denver, in the county of Denver and State of Colorado, have invented a new and useful Improvement in Automobile-Locks, of which the following is a specification.

My invention is an improvement in automobile locks, and the invention has for its object to provide mechanism capable of attachment to existing motor vehicles without change for holding the gear shift lever of the vehicle in neutral position, that is, in that position where none of the gears are in mesh, during the absence of the owner from the car or whenever else desired.

In the drawings:—Figure 1 is a perspective view of a portion of an automobile provided with the improved lock, Fig. 2 is a perspective view of the lock detached, Figs. 3 and 4 are sections on the lines 3—3 and 4—4, respectively, of Fig. 2, Fig. 5 is a transverse vertical section of a modified form, Fig. 6 is a perspective view of the support for the lock shown in Fig. 5, Fig. 7 is a section on the line 7—7 of Fig. 6, and Fig. 8 is a view similar to Fig. 3, showing a modified construction.

The present embodiment of the invention is shown in connection with the gear shift lever 1 of an automobile 2, the said lever being arranged between the seat indicated at 3 and the dash or foot board indicated at 4. The improvement comprises a shaft 5, which is journaled in Y-shaped bearing brackets 6, each of which is provided with enlarged feet 7, in the form of plates, and adapted to rest upon the floor 8 of the automobile, and to be secured thereto by means of screws 9 or the like, passed through openings in the feet into engagement with the material of the floor.

The shaft 5 is provided with a radial arm 10, the said arm having a head 11, which in the present instance, is integral with the shaft as shown in Fig. 4. At each of the bearing brackets 6, the shaft has a stop 12, in the form of a collar for limiting the longitudinal movement of the shaft in the bearing brackets, and the arm 10 is provided with an integral extension 13, having at its outer end a clamp.

The extension 13 is arched as shown, and is arranged with its convex edge upward, and the extension is integral with the arm extending the arm at an acute angle as shown. In other words the extension 13 extends from the arm 10 at an acute angle in the direction of the shaft 5, and the extension then arches upwardly and rearwardly toward the seat.

The free end of the extension is a little in rear of the angle between the extension and the arm, and a clamp or holding device is connected with the free end of the extension. This clamp is in the form of a transversely curved plate or shoe 14, which is integral with the extension, in the present instance, and the plate is provided at each side edge and intermediate the ends of the said side edge with an extension 15, the said extensions being parallel as shown, and spaced apart laterally from each other a sufficient distance to permit the gear shift lever 1 to pass between them into engagement with the shoe 14.

The extensions or arms 15 have registering openings and a locking bolt 16 is adapted to be passed through the registering openings. The said bolt has at one end a head 17 for limiting its movement through the openings and the other end is provided with an opening for receiving the shackle of a padlock 19.

The padlock may be of any desired or usual construction, and the locking bolt 16 is of such length that when the head 17 is in abutting relation with one of the arms 15 the opening 18 will be outside of the other arm in position to be engaged by the shackle of the padlock.

As is known, with the gear shift lever in neutral position the fuel may be turned on and the sparking device may be operative, but the car cannot move because the engine is cut off from the axle or wheels. The motor will run but the vehicle will not, and with the gear shift lever locked in such manner that it cannot be shifted to engage the gears, the car cannot be moved under its own power. Hence with the lever locked the car is absolutely safe in the absence of the owner for it cannot run under its own power until the gear shift lever is released.

The driver when he intends to leave the car will move the gear shift lever 1 into neutral position, which will be in engagement with the shoe 14 with the parts in the position of Fig. 1. The bolt 16 is removed to permit the entrance of the shift lever between the arms 15, and when the gear shift lever is in place the bolt is passed through the openings of the arms and is engaged with the padlock. The gear shift lever cannot move rearwardly because the angle between the arm 10 and the extension 13 will engage the floor of the car to prevent this movement. Neither can it move forwardly for the arm and extension will prevent such forward movement.

When the driver wishes to start the car he will release the padlock and withdraw the bolt 16 to release the shift lever. He may then replace the bolt and re-lock the padlock. He will then turn the arm 10 and the extension 13 forwardly to swing them out of the way of the shift lever.

In Figs. 5, 6 and 7 is shown a modified arrangement, wherein the shaft 5ª corresponding to the shaft 5 of Figs. 1 to 4, is journaled in bearing brackets 6ª, having the feet 7ª for receiving the screws 9ª. The bearing brackets 6ª are mounted on the foot board 20 of the car, and the shaft is provided with a radial arm 21. This arm has a bearing 22 at one end engaging the shaft and collars 23 are mounted on the shaft on each of the bearings. Each collar has a set screw 24, threaded radially through the same into engagement with the shaft to prevent movement of the collar laterally and the collars hold the arm 21 in proper position on the shaft.

The free end of the arm 21 is provided with a transversely curved plate or shoe 25, corresponding to the shoe 14 of Figs. 1 and 2, and this shoe has arms or extensions 26, corresponding to the arms 15 of the embodiment just described. These arms have openings for receiving the bolt 27, and the said bolt has an opening for engagement by the shackle of the padlock 28.

The bolt 27 is similar to the bolt 16, and the shift lever 29 is engaged against the shoe and between the arms 20 when in neutral position. When the arm 21 is not in use it may be swung down into the dotted line position of Fig. 5, where it will be out of the way and will not interfere with the movement of the shift lever.

The invention comprises in its simplest form a locking arm having the shoe for embracing the shift lever and having the locking bolts in connection with the shoe together with the mounting for the locking arm for permitting it to swing into and out of operative position.

In Fig. 8 is shown a modified construction, wherein the shoe 30, which corresponds to the shoes 14 and 25, is provided with the arms or extensions 31, corresponding to the arms or extensions 15 and 26. The extensions are provided with openings 32 for receiving the shackle 33 of a padlock 34. The only difference between this construction and those shown in Figs. 1 and 5, is that the locking bolt 16 is omitted, the shackle of the padlock taking the place of the locking bolt.

It will be obvious from a consideration of the drawing that the length of the shaft is greater than the length of the arm, that is, greater than the distance between the shoe and the shaft. Thus the shaft is of relatively greater length and supported at points relatively far apart to prevent a small lateral pressure on the lever end of the holding arm from causing a great strain upon the supporting shaft.

I claim:—

1. A locking device for the gear shift lever of a motor vehicle, for locking said lever in neutral position, comprising a shaft having a radial arm, said shaft being of relatively great length and supported at points relatively far apart, the arm having an extension curving toward the shaft and then away from the shaft, and provided with a shoe at its free end for engaging the lever, and means in connection with the shoe for locking the lever in the shoe.

2. A locking device for the gear shift lever of a motor vehicle, for locking said lever in neutral position, comprising a shaft having a radial arm, said shaft being of relatively great length and supported at points relatively far apart, the arm having a shoe at its free end for receiving the lever, and the shoe having locking means in connection therewith for locking the lever in the shoe.

3. A locking device with a gear shift lever of a motor vehicle, for locking said lever in neutral position, comprising a shaft having a rigid radially extending arm intermediate its ends, said arm having a locking shoe at the end remote from the shaft, and the length of the shaft being greater than the distance between the shaft and the shoe, and means at the ends of the shaft for journaling the shaft on the vehicle.

WILLIAM J. MILES.

Witnesses:
SALLIE MAY COBB.
M. J. SCHNEIDER.